United States Patent
Koeppel et al.

(10) Patent No.: US 11,608,831 B2
(45) Date of Patent: Mar. 21, 2023

(54) LUBRICANT PUMP WITH AUTOMATICALLY COUPLING PUMP UNIT AND METHOD FOR COUPLING A PUMP UNIT TO A LUBRICANT PUMP

(71) Applicant: BAIER & KOEPPEL GMBH & CO. KG, Pegnitz (DE)

(72) Inventors: Bernhard Koeppel, Pegnitz (DE); Thomas Wolf, Goessweinstein (DE)

(73) Assignee: BAIER & KOEPPEL GMBH & CO. KG, Pegnitz (DE)

( * ) Notice: Subject to any disclaimer, the term of this patent is extended or adjusted under 35 U.S.C. 154(b) by 383 days.

(21) Appl. No.: 16/818,532

(22) Filed: Mar. 13, 2020

(65) Prior Publication Data
US 2020/0291945 A1    Sep. 17, 2020

(30) Foreign Application Priority Data
Mar. 14, 2019   (DE) .......................... 102019106531.3

(51) Int. Cl.
*F04D 13/02*  (2006.01)
*F04D 29/049*  (2006.01)
(Continued)

(52) U.S. Cl.
CPC ............ *F04D 13/021* (2013.01); *F04B 53/14* (2013.01); *F04B 53/16* (2013.01); *F04B 53/22* (2013.01);
(Continued)

(58) Field of Classification Search
CPC ...... F04D 13/021; F04D 29/049; F04B 1/053; F04B 1/0531; F04B 53/14; F04B 53/16;
(Continued)

(56) References Cited

U.S. PATENT DOCUMENTS 2,424,532 A    7/1947  Beard
2,612,837 A *  10/1952 Midgette ............... F04B 1/0443
                                                  417/486
(Continued)

FOREIGN PATENT DOCUMENTS

DE    3420520 A1    12/1985
DE    4427612 A1     8/1995
(Continued)

*Primary Examiner* — Kenneth J Hansen
*Assistant Examiner* — Benjamin Doyle
(74) *Attorney, Agent, or Firm* — Quarles & Brady LLP (57) ABSTRACT

A lubricant pump for conveying lubricant from a lubricant reservoir to a pump outlet includes a pump housing with a longitudinal axis. The pump housing has a receiving opening for a pump unit, a lubricant inlet opening and a lubricant outlet opening opening into the receiving opening, a pump drive, and a pump unit with a reciprocatingly movable delivery piston. The pump unit has a suction opening, which corresponds with the lubricant outlet opening when the pump unit is inserted into the receiving opening, and an outlet opening for lubricant. A coupling mechanism for driving the at least one pump unit includes an eccentric element which is rotatable about the longitudinal axis, a drive-side coupling section connected to the eccentric element, and a pump-side coupling section. The drive-side coupling section and the pump-side coupling section can be connected to one another automatically via a resilient latching connection.

26 Claims, 5 Drawing Sheets

(51) Int. Cl.
*F04B 53/16* (2006.01)
*F16N 13/02* (2006.01)
*F04B 53/14* (2006.01)
*F04B 53/22* (2006.01)
*F04B 1/0531* (2020.01)
*F04B 1/053* (2020.01)

(52) U.S. Cl.
CPC ............ *F04D 29/049* (2013.01); *F16N 13/02* (2013.01); *F04B 1/053* (2013.01); *F04B 1/0531* (2013.01)

(58) Field of Classification Search
CPC ........ F04B 53/22; F04B 1/0426; F04B 9/045; F16N 13/02
USPC .......................................................... 92/128
See application file for complete search history.

(56) References Cited

U.S. PATENT DOCUMENTS

| | | | | |
|---|---|---|---|---|
| 2,621,607 | A * | 12/1952 | Trapp | F04B 1/0426 417/490 |
| 3,295,459 | A * | 1/1967 | Griffith | F04B 1/1071 91/496 |
| 3,570,372 | A * | 3/1971 | Campbell | F04B 1/053 91/496 |
| 3,857,642 | A * | 12/1974 | Miller | F04B 53/144 403/112 |
| 4,011,796 | A * | 3/1977 | Erickson | F04B 49/128 91/488 |
| 4,237,741 | A * | 12/1980 | Hut | F01B 1/062 74/52 |
| 4,498,372 | A * | 2/1985 | Pareja | F16J 1/14 92/187 |
| 4,983,100 | A * | 1/1991 | Budecker | F04B 1/0426 92/148 |
| 5,569,025 | A * | 10/1996 | Bendel | B60T 8/4022 417/434 |
| 5,573,386 | A * | 11/1996 | Schmitt | F04B 9/045 417/521 |
| 5,642,988 | A * | 7/1997 | Zorn | F04B 9/045 417/273 |
| 5,785,430 | A * | 7/1998 | Bright | F16C 3/22 417/273 |
| 5,884,608 | A * | 3/1999 | Cooke | F04B 49/08 123/495 |
| 5,897,302 | A * | 4/1999 | Siegel | F04B 1/0426 92/138 |
| 5,979,297 | A * | 11/1999 | Ricco | F04B 1/0408 417/470 |
| 6,109,894 | A * | 8/2000 | Chatelain | F02M 59/102 92/72 |
| 6,183,212 | B1 * | 2/2001 | Djordjevic | F04B 1/0426 417/462 |
| 6,244,832 | B1 * | 6/2001 | Guentert | F04B 1/0435 417/269 |
| 6,347,574 | B1 * | 2/2002 | Guentert | F04B 1/0426 92/72 |
| 6,412,474 | B1 * | 7/2002 | Guentert | F02M 63/0225 123/456 |
| 6,485,278 | B2 * | 11/2002 | Reuter | F04B 39/0016 417/549 |
| 6,523,524 | B1 * | 2/2003 | Simon | F02M 59/102 123/450 |
| 6,641,232 | B1 * | 11/2003 | Alaze | B60T 8/4068 417/536 |
| 7,134,846 | B2 * | 11/2006 | Djordjevic | F02M 59/102 417/521 |
| 2004/0096337 | A1 * | 5/2004 | Kuhn | F04B 1/0426 417/273 |
| 2004/0165798 | A1 * | 8/2004 | Valdespino | F01L 33/04 384/447 |
| 2006/0222517 | A1 * | 10/2006 | Breuer | F02M 59/102 417/273 |
| 2012/0009073 | A1 * | 1/2012 | Hsieh | F04B 53/22 417/490 |

FOREIGN PATENT DOCUMENTS

| | | | |
|---|---|---|---|
| DE | 19650276 A1 | 6/1998 | |
| DE | 102008038767 A1 | 2/2010 | |
| EP | 1726868 A1 | 11/2006 | |
| EP | 3276172 A1 | 1/2018 | |
| EP | 3330590 A1 | 6/2018 | |
| FR | 2174365 A5 * | 10/1973 | ............. F02B 75/32 |
| FR | 2174365 A5 | 10/1973 | |
| GB | 1053378 A | 12/1966 | |
| WO | 0049291 A2 | 8/2000 | |

* cited by examiner

LUBRICANT PUMP WITH AUTOMATICALLY COUPLING PUMP UNIT AND METHOD FOR COUPLING A PUMP UNIT TO A LUBRICANT PUMP

CROSS-REFERENCE TO RELATED APPLICATIONS

This application claims priority to German Patent Application No. 102019106531.3 filed Mar. 14, 2019. The contents of this application are hereby incorporated by reference as if set forth in its entirety herein.

The disclosure relates to a lubricant pump, in particular a radial piston pump, having a pump housing, a pump drive and a coupling mechanism for driving at least one pump unit for conveying lubricant from a lubricant reservoir to at least one pump outlet for lubricant. Furthermore, the disclosure relates to a method for coupling a pump unit to a lubricant pump.

Such lubricant pumps are used, for example, to lubricate several lubrication points on a vehicle, such as a truck, on construction machinery or even in industrial plants.

Two different types of pump units or pump elements are known from the prior art for radial piston pumps, namely pump units with spring return and pump units with mechanically controlled suction and pressure stroke. Both types of pump units are built into the pump housing of a lubricant pump in different ways.

Pump units with spring return are simply screwed into the pump housing. They do not have to be hooked into the piston eccentric ring, but only rest against the outside of a ball bearing which sits on the piston eccentric ring. The suction stroke is controlled by the spring return, while the pressure stroke is generated by a displacement of the delivery piston by the rotating piston eccentric ring. The installation of this type of pump unit is simple. However, there is a risk of failure of the pump unit in case of spring fracture and at low temperatures a complete piston return is not guaranteed.

Lubricant pumps with spring return are known from GB 1,053,378 A, EP 3 330 590 A1 or EP 3 276 172 A1, for example.

Pump units with mechanically controlled suction and pressure strokes must be hooked into the piston eccentric ring and then screwed into the pump housing. The piston is positively guided by the piston eccentric ring for both the suction and pressure strokes. Installation and removal can only be carried out when the pump is at a standstill. In this process, the pump unit must be inserted into the pump mounting opening of the pump housing with the piston partially pulled out, tilted in relation to the radial direction (diagonally upwards). When the piston head is in the correct position above the piston eccentric ring, the pump unit must be brought into a horizontal position, wherein the piston head is hooked into a groove of the piston eccentric ring. The pump unit is then screwed into the pump housing. When dismounting, care must be taken that the piston does not remain in the pump casing. The installation of this type of pump unit is difficult and error-prone or time-consuming.

A lubricant pump with mechanically controlled suction and pressure stroke is known from EP 1 726 868 A1, for example.

These well-known lubricant pumps have the disadvantage that the pumping units used in each case either have disadvantages in operation, especially with regard to reliability, or are difficult to install or remove, for example, in the event of commissioning or for maintenance.

The present disclosure therefore has the object of providing a lubricant pump, in particular a radial piston pump, having at least one pump unit which, on the one hand, is based on a mechanically controlled suction and pressure stroke and, on the other hand, allows the pump units to be easily mounted. In addition, a method that is easy to carry out for mounting a pump unit to a lubricant pump is to be created.

This object is solved by a lubricant pump according to claim 1 as well as by a method according to claim 20.

In particular, the object is solved by a lubricant pump, in particular a radial piston pump, for conveying lubricant from a lubricant reservoir to at least one pump outlet for lubricant, comprising a pump housing with a longitudinal axis, wherein the pump housing has at least one, preferably radially aligned, receiving opening for a pump unit and a lubricant outlet opening that opens into the receiving opening, a pump drive, in particular comprising a drive shaft rotatably mounted in the pump housing, at least one pump unit with a reciprocatingly movable delivery piston, wherein the pump unit has a suction opening, which in the state of the pump unit inserted into the receiving opening corresponds with the lubricant outlet opening, and an outlet opening for lubricant, a coupling mechanism for driving the at least one pump unit, wherein coupling mechanism comprises: an eccentric element which is rotatable about the longitudinal axis by the pump drive, in particular by the drive shaft, a drive-side coupling section which is connected to the eccentric element, and a pump-side coupling section of the at least one pump unit, in particular the delivery piston, wherein the drive-side coupling section and the pump-side coupling section can be connected to one another, in particular automatically, via a preferably resilient latching connection, for coupling the pump unit to the pump drive.

One idea of the disclosure is to connect a pump unit to the pump drive by means of a latching connection, in particular a detachable latching connection, wherein the pump unit can be inserted in particular in a simple manner exclusively in the radial direction, i.e. without tilting, into a receiving opening of the pump housing in order to couple the pump unit to the pump drive.

A latching connection in the sense of the disclosure can be understood as a releasable connection based on a latching or snap-in engagement of a pump-side coupling section into a drive-side coupling section, or vice versa. A latching connection according to the disclosure is, in particular, a connection which is based on elastic deformation (effect of a spring force), i.e. which has a (re)springing effect in particular. In particular, the pump-side and drive-side coupling sections connect (automatically) to each other when the pump unit is (completely) inserted into the receiving opening of the pump casing, i.e. when inserted. A rotary movement of the pump drive or drive shaft (by manual or motor operation of the pump drive) can support or additionally simplify the establishment of the latching connection (latching engagement). This allows the drive and pump side coupling sections to be easily aligned for latching engagement (by rotation around the longitudinal axis of the pump housing), wherein the drive-side and pump-side coupling sections in particular are able to engage automatically once the correct rotational orientation is achieved.

In particular, the pump unit does not have a spring return of the delivery piston, but is based on a mechanically controlled suction and pressure stroke by the coupling mechanism. The latching connection connects the pump unit to the coupling mechanism, in particular in a form-fit detachable manner. Preferably, the lubricant pump comprises two or more pump units which can be coupled to the coupling mechanism in the same way by means of latching connections distributed around the circumference of the pump housing. Lubricant can be sucked out of a lubricant reservoir (lubricant pump floating or standing in lubricant) via a lubricant inlet opening, or supplied to the lubricant pump from a lubricant reservoir (closed lubricant container) via a supply line.

In particular, the drive shaft and the eccentric element are connected to each other in a rotationally fixed, preferably rigid, manner. The eccentric element can be designed in one or more parts, for example as a multi-part eccentric ring or eccentric disc consisting of several axial sections. The drive-side coupling section can be connected to the eccentric element in a rotationally fixed or torsion-free manner (directly or indirectly). In particular, the coupling mechanism is (completely) accommodated in the pump housing. The pump drive may include a motor, the output shaft of which is preferably connected to the input shaft, optionally via a transmission, or is identical to it. Preferably, the delivery piston has or forms the pump-side coupling section. In principle, however, it would also be kinematically conceivable that a pump cylinder has the coupling section on the pump side, while the piston is firmly connected to the pump housing.

A lubricant pump according to the disclosure has the advantage that a pump unit is easier to assemble and disassemble than in the prior art, and thus in particular faster and with fewer errors. In particular, a pump unit can easily be pushed (exclusively) in the radial direction into the pump housing or pulled out of the pump housing, wherein the latching connection is (automatically) established and released again. The conventional tilted insertion (relative to the radial direction) of the pump unit and subsequent tilting to the radial (horizontal) orientation back to hook the pump unit into the coupling mechanism is no longer necessary. This simplifies the coupling process.

In an advantageous further development of the disclosure, the drive-side coupling section has at least one drive-side latching element and the pump-side coupling section has or forms a pump-side latching element, wherein the at least one drive-side latching element and the pump-side latching element cooperate positively in the coupled state of the pump unit, and in particular engage one into the other or mutually engage one behind the other. Preferably, the latching element on the drive side and the latching element on the pump side engage with each other in the axial direction or engage behind each other in the radial direction. A coupled state can be understood to be a state of the coupling mechanism in which the latching connection is established, wherein the pump unit is in particular fully inserted into the receiving opening and coupled to the pump drive or the coupling mechanism. A latching element on the drive side or pump side can be designed as a recess (latching recess) or as a projection (latching projection), in particular as a groove or engagement element (engaging in the groove). Over the circumference of the drive-side coupling section or the pump housing, several (similar) drive-side latching elements can be distributed, each of which is assigned to a pump receiving opening or a pump unit.

In an advantageous further development of the disclosure, the drive-side latching element and the pump-side latching element have latching recesses or latching projections, or vice versa, which are shaped to fit each other. In particular, the dimensions of the latching elements match each other in the radial direction, which means that a suction and pressure stroke, i.e. a pulling or pushing movement in the radial direction, can be carried out with as little play as possible. In some embodiments, the latching elements transverse to the radial direction are not designed to match each other, which allows a relative movement transverse to the radial direction, for example in the case of a tumbling movement.

In an advantageous further development of the disclosure, the coupling mechanism comprises at least one resilient latching element, in particular a resilient drive-side latching element and/or a resilient pump-side latching element, wherein the resilient latching element is in particular elastically deformable (e.g. as a spring sheet element) and/or resiliently mounted, preferably displaceably mounted against a displacement restoring force (e.g. applied by a restoring spring). In particular, a latching element (or both latching elements) deforms or shifts when a pump unit is inserted in a radial direction for coupling into a receiving opening of the pump housing, in particular when a (self-shifting) latching element comes into contact (sliding contact) with the shifting latching element and thereby mechanically causes its deformation or shifting. This results in a latching connection that can be produced automatically.

In an advantageous further development of the disclosure, the at least one resilient latching element is at least substantially displaceable parallel to a radial direction of the pump housing. In particular, the spring constant of a spring element for sliding support of the latching element is sufficiently large to apply the radial force required for a suction stroke to the pump unit.

In an alternative advantageous further development of the disclosure, the at least one resilient latching element is displaceable at least substantially perpendicular to a radial direction of the pump housing, particularly preferably parallel to the longitudinal axis. In particular, the latching element springs perpendicular to the radial direction or parallel to the longitudinal axis. The latching element can be displaced in particular relative to the drive-side or pump-side coupling section. The latching element can be elastically deformable and/or mounted on the drive-side coupling section or pump-side coupling section so as to be displaceable against a displacement restoring force. Preferably, the drive-side latching element is displaced (pushed to the side) by the pump-side latching element perpendicular to the (radial) insertion direction (against a displacement restoring force) during coupling. A displaceability of the latching element perpendicular to the radial direction has the advantage that the spring constant of a spring element can be selected comparatively small for the displaceable mounting of the latching element. In particular, the spring element is not stressed by any load during a suction stroke.

In an advantageous further development of the disclosure, in particular the aspect of a resilient latching element, the coupling mechanism comprises a spring element which applies a displacement restoring force to a displaceably mounted latching element, and is supported in particular against the drive-side coupling section or the pump-side coupling section. In particular, the spring element provides a restoring force that has to be overcome for coupling, which could also be described as a required engagement force. On the one hand, a spring element is used to create an automatically producible latching connection. On the other hand, a wear-resistant (rigid, i.e. not even elastically deformable) latching element can be used.

In an advantageous further development of the disclosure, the coupling mechanism comprises a displacement guide for a displaceable latching element, which in particular limits the displacement path of the latching element, preferably by stop surfaces, wherein the displacement guide limits in particular a latching position and/or an unlatching position of the latching element. A latching position can be understood as a coupling position and an unlatching position as a decoupling position of the pump unit. A displacement guide guarantees defined kinematics of the coupling mechanism for the coupling process and ensures reliable coupling.

In an embodiment of the disclosure, the eccentric element is non-rotatably connected to the drive-side coupling section, wherein the drive-side coupling section is designed in particular as an eccentric ring which forms a circumferential drive-side latching element, preferably an annular latching projection or an annular latching groove. A fixed connection also includes the integral nature of the eccentric element and the drive-side coupling section. With a corresponding embodiment, the coupling section on the pump side slides in the circumferential direction along the rotating eccentric ring during operation (when the pump drive is rotating). The eccentric ring can have a circumferential locking groove as a locking element.

In an alternative embodiment of the disclosure, the drive-side coupling section comprises a, preferably annular, carrier element which is rotatably mounted relative to the eccentric element, preferably by at least one rolling bearing, and in particular carries a drive-side latching element. Preferably, the carrier element is ring-shaped (i.e. as a carrier ring) and can in particular have a stepped (L-shaped or Z-shaped) cross-section. In particular, an outer bearing ring of the at least one rolling bearing (radial and/or axial rolling bearing) supports the carrier element, wherein the inner bearing ring in particular is seated on an outer surface of the eccentric element. The non-rotating bearing arrangement of the carrier element is preferably designed as a double bearing arrangement (with two rolling bearings), preferably with one radial and one axial rolling bearing, in order to reduce the susceptibility to wear. The rolling bearings are particularly self-lubricating, wherein the rolling bearings are preferably closed (fluid-tight). By means of a rotational degree of freedom between the eccentric element and the drive-side coupling section, the relative movement in the direction of rotation, i.e. in the circumferential direction, can be compensated, preferably by a rolling bearing. This can reduce or prevent sliding friction between the eccentric element and the pump unit, especially the piston head of the delivery piston.

In an advantageous further development, in particular of this embodiment of the disclosure, a guide element is radially displaceably mounted, preferably resiliently, in the pump housing, wherein the carrier element forms a sliding surface for the forced guidance of the carrier element by the guide element, wherein the carrier element performs in particular a tumbling movement about the longitudinal axis of the pump housing. In particular, the carrier element has a flat outer circumferential section which forms the sliding surface.

In an advantageous further development, in particular of this embodiment of the disclosure, the spring element is arranged between the latching element and the carrier element, in particular acting parallel to the longitudinal axis, preferably received in a spring guide opening of the latching element. A latching element spring-mounted by the spring element is preferably a drive-side latching element, but could also be a pump-side latching element. For example, the spring element is a coil spring, but could also be a disc spring or a spring of a different type. In particular, the spring element applies a displacement restoring force to the drive-side latching element when this is displaced (pressed) by the pump-side latching element in the direction of the carrier element during a latching operation, preferably guided by the displacement guide.

In an advantageous further development, in particular of this embodiment of the disclosure, the displacement guide comprises a guide element for the latching element which is slidably mounted in the carrier element, preferably parallel to the longitudinal axis, wherein the guide element is slidably guided in particular in a passage opening of the carrier element. In particular, the guide element is accommodated in an annular section of the carrier element. The guide element is preferably designed as a guide pin, with the passage opening being formed as a through-hole. A latching element spring-mounted by the spring element is preferably a drive-side latching element, but could also be a pump-side latching element. A slide bushing can be provided in the passage opening or on the guide element.

In an advantageous further development, in particular of this embodiment of the disclosure, the guide element forms a stop surface on a side of the carrier element remote from the latching element, which defines a maximum latching position of the latching element, wherein in particular the guide element is connected to the latching element on the side facing the latching element. In particular, the stop surface defines a maximum latching position of the latching element when it is in contact with the carrier element. A lower side of a head section (screw head) of the guide element or an annular surface of a slide bushing can serve as a stop surface. A maximum release position can be defined by a surface of the latching element. A guide element designed as a guide pin can have a threaded section at the end, with which the guide pin is screwed into the latching element, or a latching block forming the latching element, on the side facing the latching element.

In an advantageous further development of the disclosure, the pump-side latching element is formed by a circumferential projection of the delivery piston and/or a drive-side latching element is formed by a latching projection extending transversely to a radial direction, preferably straight. The circumferential projection of the delivery piston forms, for example, an (undercut) head of the delivery piston and is separated from the sliding section of the delivery piston in particular by a peripheral groove (e.g. a peripheral groove produced by recess turning). A latching projection (projecting from a surface) can interact positively with the peripheral projection of the delivery piston, especially for the suction stroke of the delivery piston. Instead of the latching projection, a latching groove extending transversely to the radial direction could also be provided, which (each with one of the two radial groove side faces) interacts positively with the circumferential projection of the delivery piston for both the suction and pressure strokes.

In an advantageous further development, in particular of this embodiment of the disclosure, a latching block supported by the carrier element, and in particular mounted in the carrier element so as to be displaceable parallel to the longitudinal axis, forms a latching element on the drive side as a preferably straight latching projection. The (cuboid) latching block can be guided in an appropriately (essentially cuboid) shaped guide recess on the circumference of the carrier element in the axial direction. In particular, two, three, four or more latching blocks with respective latching projections are arranged evenly distributed around the circumference of the carrier element (or the lubricant pump), each of which is assigned to a pump receiving opening or a pump unit.

In an advantageous further development of the disclosure, a radially outwardly oriented latching surface of the pump-side latching element and/or a radially inwardly oriented latching surface of the drive-side latching element have a surface section which is beveled, in particular with respect to the radial direction, wherein preferably the gradients of the surface sections are at least substantially identical, preferably between 15° and 30°, particularly preferably about 20°. When the pump unit is coupled, drive-side and pump-side latching surfaces are in contact with each other, in particular to transmit a pulling movement of the coupling mechanism to the pump unit, in particular the delivery piston.

In an advantageous further development, in particular of this embodiment of the disclosure, in the coupled state of the pump unit, one end face of the latching element on the pump side, preferably the delivery piston, rests on an outer bearing ring of a rolling bearing, preferably a radial rolling bearing, held by the eccentric element, or on an outer surface of the carrier element. This allows a pressure movement of the coupling mechanism to be transmitted to the pumping unit, especially the delivery piston. In this way, the latching surfaces of the drive-side and pump-side latching elements each have to be formed on one side only, namely to effect the suction stroke, while the pressure stroke is transmitted from the bearing outer ring (directly) to the delivery piston, namely to the end face of the pump-side latching element. The bearing outer ring and/or the latching element, in particular a latching surface of the latching element, can be hardened.

In an advantageous further development, in particular of this embodiment of the disclosure, a spring element exerts a contact pressure on the pump-side latching element via beveled surface sections of the drive-side latching element and/or the pump-side latching element against the bearing outer ring of the rolling bearing or the outer surface of the carrier element. This causes the latching element on the pump side, preferably the circumferential projection, to be (slightly) clamped or tightened between the latching element on the drive side (latching projection) and the bearing outer ring. In this way, tolerances can be compensated, especially between the drive-side latching element and the pump-side latching element. As a result, the suction stroke and the pressure can be carried out with as little play as possible, since the latching element on the pump side (circumferential projection) rests (in a play-free manner) on both sides of the drive-side coupling section, i.e. on the bearing outer ring and on the inside of the latching projection.

In an advantageous further development of the disclosure, a guide surface, in particular a guide circumferential surface, of the pump-side latching element and/or a guide surface of the drive-side latching element is beveled, in particular with respect to the radial direction, wherein preferably the gradients of the guide surfaces are at least substantially identical, preferably between 20° and 30°, particularly preferably about 25°. Guide surfaces can be defined as surfaces (contact or sliding surfaces) which, during an engagement process, transmit forces (in axial and/or radial direction) for guiding the engagement elements, in particular for displacing a resilient latching element (sliding past each other). Guide surfaces facilitate the coupling (insertion) or uncoupling (extraction) of the pump unit.

The aforementioned object is also solved in particular by a method for coupling a pump unit to a lubricant pump, in particular a radial piston pump, in particular to a lubricant pump according to the disclosure, comprising the following steps:

Insertion of a pump unit into a preferably radially oriented receiving opening of a pump housing of the lubricant pump,
wherein the pump housing has a longitudinal axis and in particular has a lubricant outlet opening which opens into the receiving opening, wherein the pump unit comprises in particular a reciprocatingly movable delivery piston, a suction opening and an outlet opening for lubricant, Optional alignment, especially rotation, of the pump unit in such a way that a suction opening of the pump unit corresponds with the lubricant outlet port, Coupling of the pump unit to a coupling mechanism of the lubricant pump by producing a, preferably resilient, latching connection of a pump-side coupling section of the pump unit, in particular of the delivery piston, with a drive-side coupling section which is connected to an eccentric element, wherein the eccentric element is rotatable about the longitudinal axis by a pump drive for driving the coupling mechanism,
wherein the latching connection is produced in particular by rotation of the eccentric element, preferably by actuation of the pump drive, and latching of the pump-side coupling section into the drive-side coupling section, preferably automatically.

The method has similar advantages as those described in connection with the lubricant pump according to the disclosure. In particular, the method can implement some or all of the process engineering features described in connection with the lubricant pump.

The rotary motion generated by (manual or motor operation) of the pump drive or drive shaft can support or additionally simplify the creation of the latching connection (engagement). The rotation simply aligns the drive-side and pump-side coupling sections for engagement. As a result, the drive-side and pump-side coupling sections in particular can automatically engage with each other as soon as the correct rotational orientation is achieved. A complex and difficult rotational alignment of the coupling mechanism to the respective receiving opening of the pump housing can be omitted. Rather, the pump unit can be inserted into the receiving opening in any rotational position of the lubricant pump, wherein, when the suitable alignment of a drive-side coupling section (of optionally several possible free coupling sections) relative to the pump-side coupling section is reached, the two coupling sections—assuming a sufficient contact pressure of the pump unit against the drive-side coupling section to overcome the displacement restoring force due to the insertion movement—engage (automatically) into each other by themselves. The pump unit is screwed into the pump casing by means of screws and a flange, preferably of the pump cylinder.

In an advantageous further development of the method, a displacement restoring force applied by a spring element to a displaceable latching element, in particular a displaceable drive-side latching element and/or a displaceable pump-side latching element, is overcome to produce the latching connection. The displacement restoring force to be overcome by (manual) insertion of the pump unit ensures that the drive-side and pump-side latching elements engage (snap) into each other, forming a latching connection with each other.

Embodiment examples of the disclosure are explained in more detail below by reference to the drawings, wherein.

In the following description of the disclosure, the same reference numerals are used for identical and similarly acting elements.

Figure 3A:
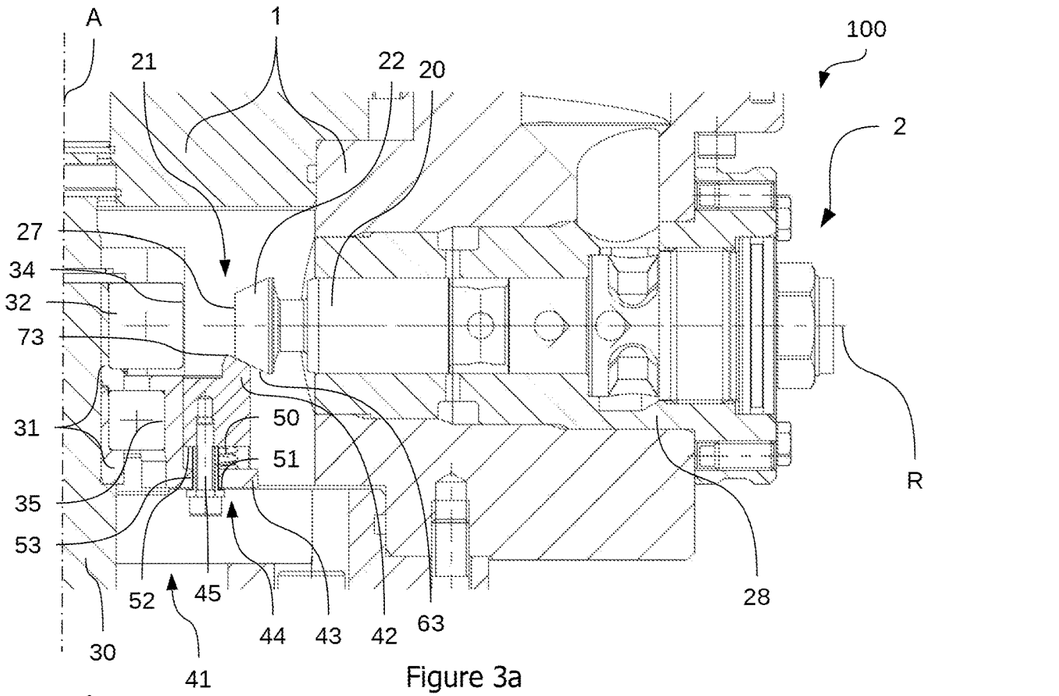
FIG. 3a shows a section of the embodiment as shown in FIG. 1 with a latching connection not (yet) made at a first rotational position of the drive shaft in a longitudinal sectional view.
Figure 3B:
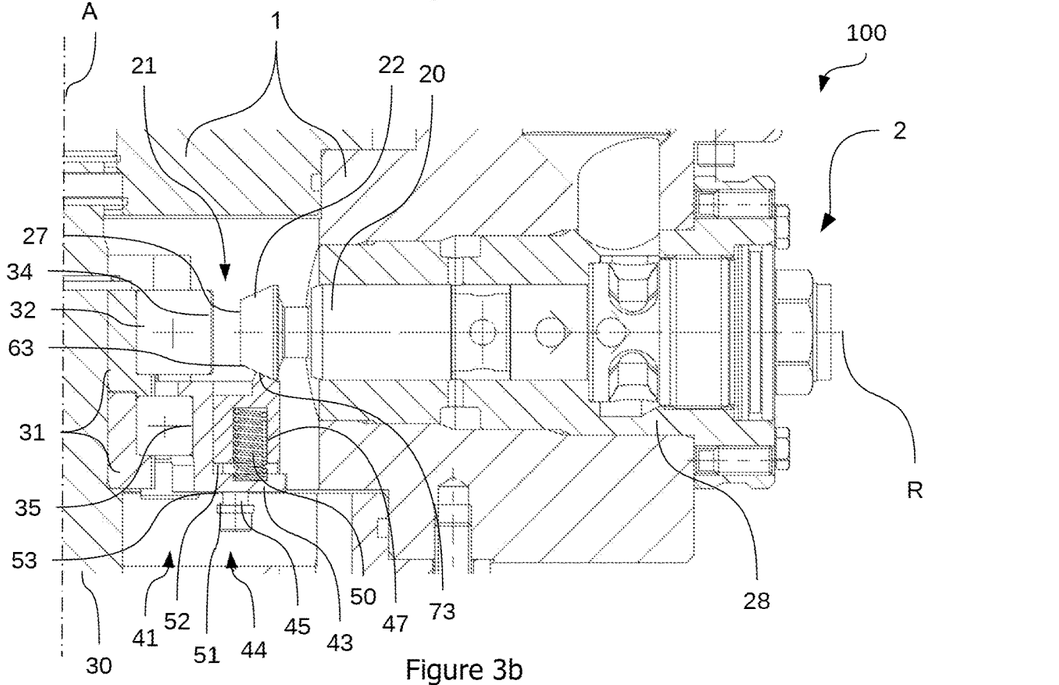
FIG. 3b shows a section of the embodiment as shown in FIG. 1 with a latching connection not (yet) made at a second rotational position of the drive shaft in a longitudinal sectional view.
Figure 4:
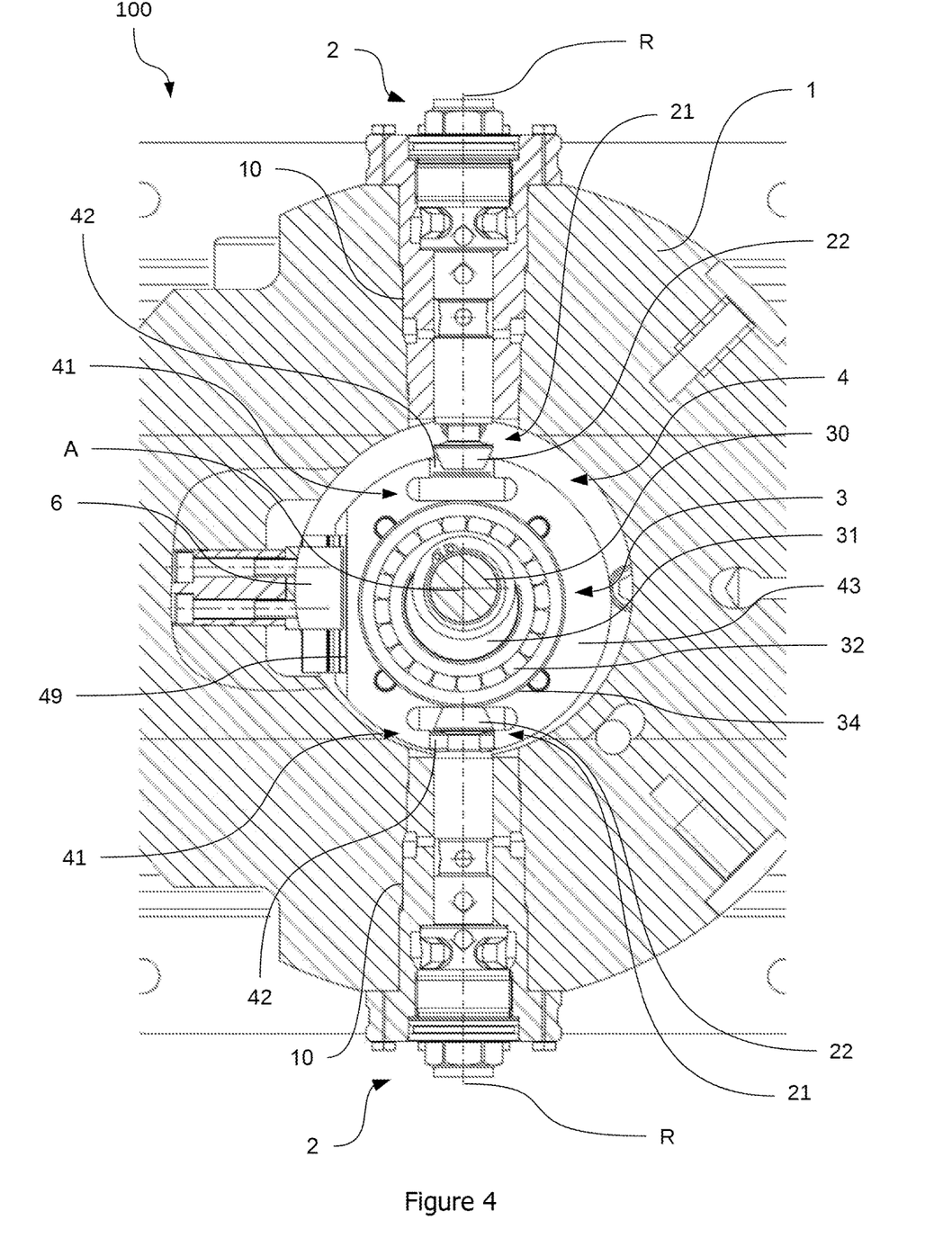
FIG. 4 shows a section of the embodiment as shown in FIG. 1 in a cross-sectional view.
Figure 5:
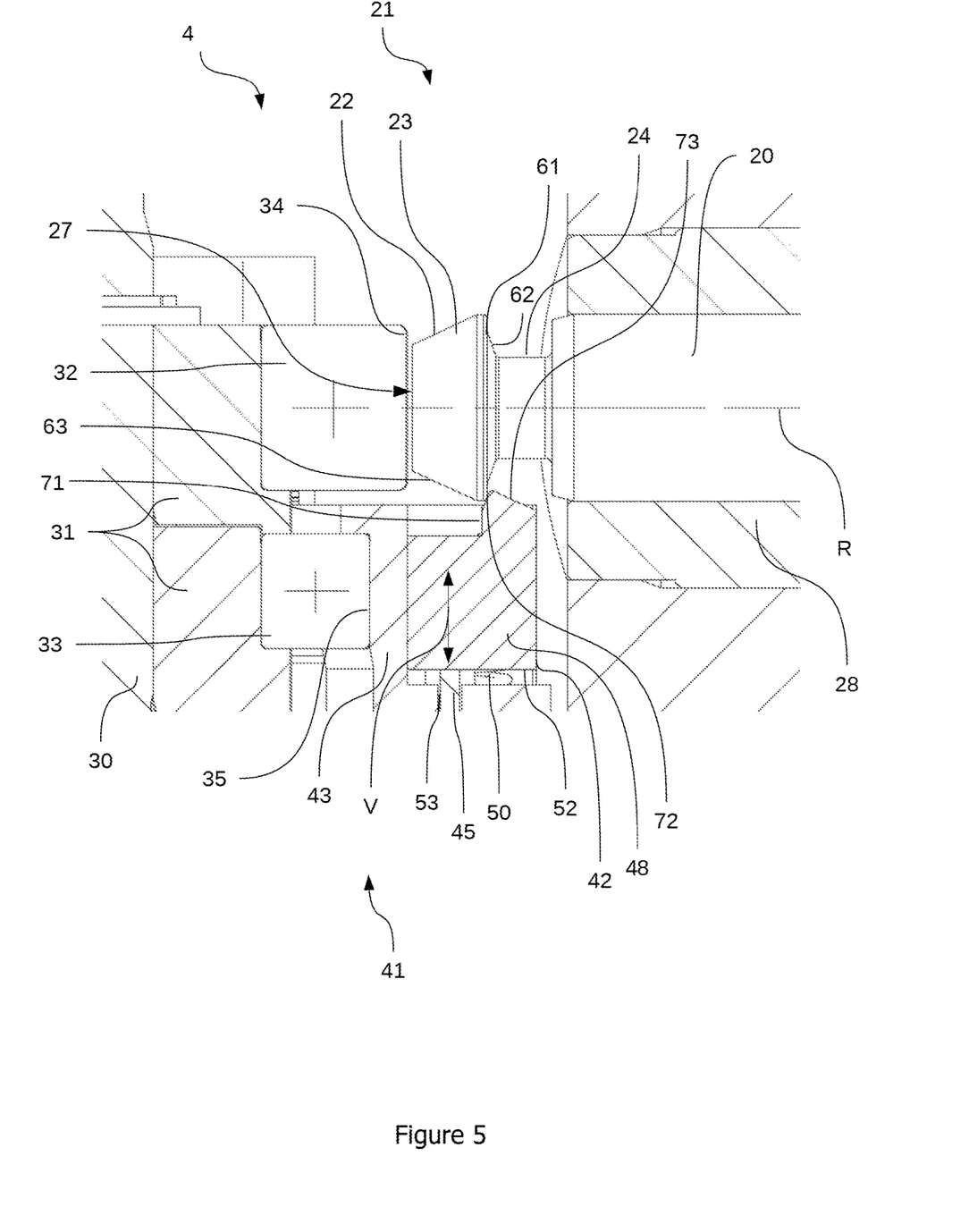
FIG. 5 shows a section of the embodiment as shown in FIG. 1 in an enlarged longitudinal section view.

FIGS. 1 to 5 show an embodiment of a lubricant pump according to the disclosure, wherein a section of a sectional view is shown. FIGS. 1, 2, 3a and 3b each show a section of a half-section along the longitudinal axis A of the pump housing 1. FIG. 4 shows a section of a cross-sectional view and FIG. 5 shows an enlarged longitudinal view.

Two pump units 2 (see FIG. 4) are inserted or can be inserted in one receiving opening 10 each of the pump housing 1. The receiving openings in 10 are aligned in a radial direction R, i.e. they are opened inwards towards the longitudinal axis A or outwards. A pump drive 3 includes a motor (not shown) that drives a drive shaft 30. The drive shaft 30 is rigidly connected to an eccentric element 31. When the pump drive 3 or the drive shaft 30 rotates, the coupling mechanism 4 generates a translatory movement of the delivery piston 20 guided in the pump cylinder 28 via the eccentric element 30, which moves back and forth to perform a suction or pressure stroke. Via a lubricant inlet (not shown) lubricant enters the lubricant pump 100 or the pump housing 1 via a supply line from a lubricant container or directly from a lubricant reservoir and is fed via lubricant channels to the lubricant outlet opening 12. From there, lubricant is sucked in via corresponding suction openings 25 of pump unit 2 during the suction stroke into a dosing volume in pump cylinder 28 and pushed out of the outlet opening 26 during the delivery stroke in order to be guided to a lubrication point via lines to be connected to one or more pump outlets.

Figure 1:
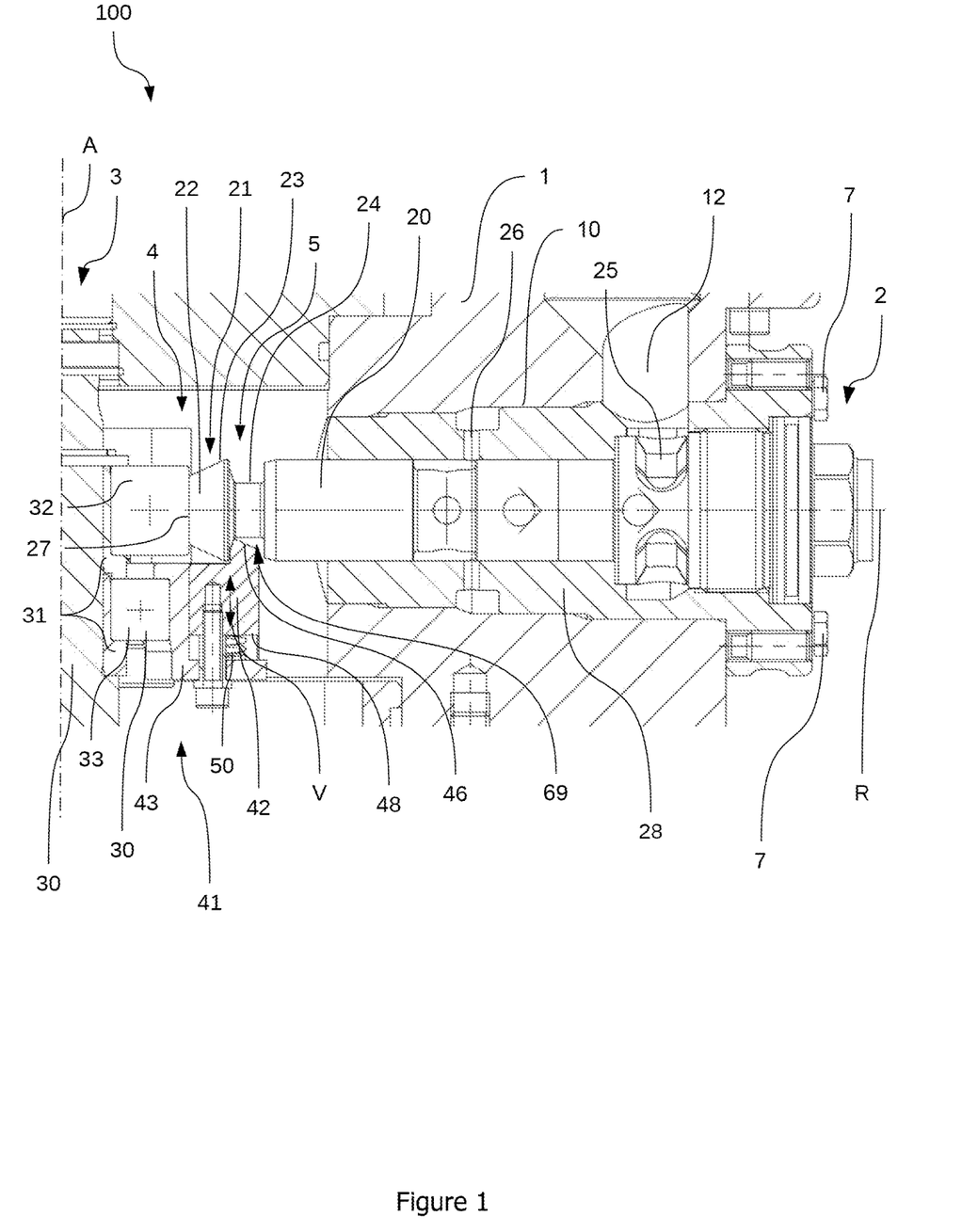
FIG. 1 shows a section of an embodiment of the lubricant pump according to the disclosure with a pump unit in the coupled state in a longitudinal sectional view.
Figure 2:
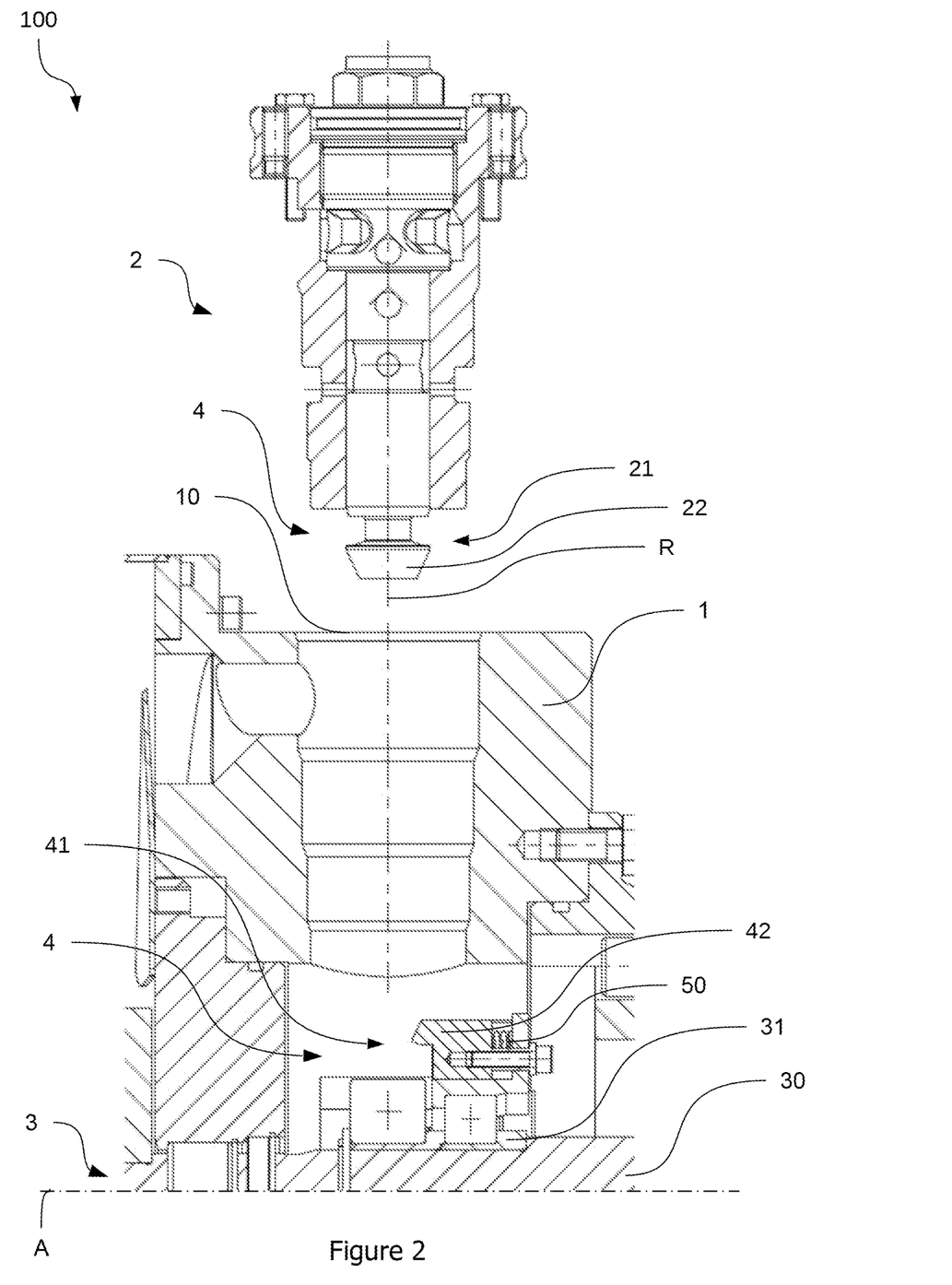
FIG. 2 shows a section of the embodiment as shown in FIG. 1 (rotated 90°) with a decoupled pump unit in a longitudinal sectional view.

The coupling mechanism 4 has a drive-side coupling section 41 and a pump-side coupling section 21, which according to the disclosure are connected to each other by a latching connection 5 (see FIG. 1). In the figures, the drive-side and pump-side coupling sections 41 and 21 are shown in different positions, respectively. Pump unit 2 is coupled to pump drive 3 in a latching position (see FIG. 1) and can be uncoupled from pump drive 3 in an unlatching position (similar to FIG. 5). When commissioning or servicing the lubricant pump 100, pump units 2 must be coupled and uncoupled, i.e. mounted or dismounted. For this purpose, the pump units 2 are inserted into the receiving openings 10 and pulled out, wherein the latching connection 5 is established or released. An advantage of the disclosure is that the pump units 2 can be very easily inserted into the pump housing 1 in an exclusively radial direction without additional tilting, wherein the coupling sections 21 and 41 engage with each other, preferably automatically, to form the latching connection 5. The pump units 2 are fixed in the pump housing 1 by means of screwed connections 7.

In the embodiment shown in the figures, the drive-side coupling section 41 is rotatably mounted relative to the eccentric element 31, namely via the rolling bearings 32 and 33, wherein both rolling bearings 32, 33 are designed as radial rolling bearings, each as a ball bearing with an inner bearing ring and an outer bearing ring 34 and 35, respectively. The rolling bearings 32, 33 are formed in a closed and self-lubricating manner. The inner bearing rings are located on the two-part eccentric element 31, which is axially split into two sections. An annular carrier element 43 with a Z-shaped cross-section is mounted on the outer bearing ring 35. In FIGS. 3a and 3b the eccentric element 31 is shown in two different rotational positions.

In the embodiment shown, a guide element 6 (see FIG. 4), spring-mounted in the pump housing 1, here designed as a guide bolt, rests on the sliding surface 49 of the carrier element 43 and causes a forced guidance of the carrier element 43, which as a result performs a tumbling movement about the longitudinal axis A. The sliding surface 49 is formed by a flat outer circumferential section of the annular carrier element 43.

In an alternative embodiment, the eccentric element 31 could be connected non-rotatably (i.e. without the roller bearings 32, 33) to the drive-side coupling section 41, i.e. it can be designed as an integral eccentric ring, in which the pump-side coupling section 21 engages.

In the embodiment shown in the figures, the drive-side coupling section 41 has drive-side latching elements 42 and the pump-side coupling section 21 forms the pump-side latching element 22. The latching element 22 on the pump side is designed as a circumferential projection 23 in the form of a round truncated cone, which is separated from the slidingly guided section of the delivery piston 20 by a circumferential groove 24. In this respect, the circumferential projection 23 forms a piston head of the pump unit 2. The carrier element 43 of the drive-side coupling section 41 carries the latching block 48, which carries the latching projection 46 as a rib extending in a straight manner and projecting from the top side. The latching projection 46 is formed wider than the circumferential projection 23. The latching surfaces 61, 71 of the pump-side and drive-side latching elements 22 and 42 have beveled surface sections 62 and 72. The latching surfaces 61, 71 rest against each other in the latching position to transmit a radial force for a suction stroke. In addition, elements 22, 42 have guide surfaces 63 and 73, on which the latching elements 22, 42 slide along or past each other during an engagement process. This results in a displacement movement of the latching block 48, which is spring-mounted via a spring element 50 (see double arrow in FIGS. 1 and 5). The spring element 50 exerts a displacement restoring force against the displacement movement (upwards in FIGS. 1, 2, 3a, 3b and 5). A displacement guide 44 guides the drive-side latching element 22 or the latching block 48 in axial direction. The displacement guide 44 has a guide element 45 designed as a guide pin, which is slidingly guided in a through opening 53 of an annular peripheral section of the carrier element 43 via a slide bushing. The stop surface 52 in the form of the underside of the latching block 48 defines a maximum (lower) unlocking position, which is not reached in FIG. 3b. Preferably, the release position is not fully reached during coupling in order to fully enable the required displacement of the drive-side latching element 22. The stop surface 51 on the rear side of the head section of the guide element 45 designed as a guide pin defines a maximum (upper) locking position. This maximum latching position is preferably not quite reached with preferably produced latching connection 5, in order to create a coupling mechanism 4 that is as free of play as possible. The spring element 50 is guided in a spring guide opening 47 in the latching block 48 (see FIG. 3b). The spring element 50 presses the latching section 22 on the pump side against the outer bearing ring 34 (see FIG. 1) via the beveled surface sections 62, 72, thus compensating for tolerances and making latching connection 5 free of play. The radial force for a pressure stroke is transmitted directly from the bearing outer ring to the end face 27 of the latching element 22 on the pump side or the circumferential projection 23. The outer bearing ring 34 and/or the latching elements 22, 42, in particular the latching surfaces 61, 71 of the latching elements 22, 42, can be hardened.

The operation of the lubricant pump 100 or the method according to the disclosure is as follows: The drive shaft 31 rotates (e.g. clockwise) and moves the drive-side coupling section 41 to the delivery piston 20 of pump unit 2 (FIG. 3b). The drive-side coupling section 41 engages in the carrier element 43 (FIG. 4). This is connected to the eccentric element 31 via roller bearings 32, 33. The carrier element 43 is additionally (in FIG. 4 in 12 o'clock position) positively guided by a guide bolt 6. The eccentric element 31 and the guide bolt 6 give the carrier element 43 or the drive-side coupling section 41 a tumbling movement (no pure rotation and no translation). The delivery piston 20 is only engaged with the drive-side coupling section 41. The drive-side coupling section 41 (FIGS. 3b and 5) is displaced in the axial direction by the tumbling movement towards the delivery piston 20 via inclined guide surfaces 63, 73 in the axial direction or pushed away axially (downwards in FIGS. 1, 2, 3a, 3b, 5). When the movement has overcome the inclined guide surfaces 63, 73, a spring element 50 pushes the drive-side coupling section 41 back again (upwards) and the delivery piston of the pump element is coupled with a latching connection 5 with the pump output 3, namely latched (FIG. 1). No additional manual operation is necessary. The latching elements 42 and 22 on the drive side and pump side engage or snap into each other automatically. The coupling sections 21, 41 are first aligned radially to each other by a rotary movement of the pump drive 3 or the drive shaft 30. As the eccentric element 31 shifts the drive-side coupling section 41 outwards, the coupling sections 21 and 41 automatically engage with each other. The delivery piston 20 performs its pumping work in the coupled state with mechanical forced guidance during subsequent operation.

A lubricant pump 100 according to the disclosure enables a simple and faultless coupling of the pump units 2 to the pump drive 3 via the latching connection 5, which is based in particular on spring-loaded latching elements 22 or 42. The complex and difficult tilting of the pump units 2 when inserting them into the receiving opening 10 in order to be able to suspend them in a rigid, i.e. non-deformable or axially non-displaceable eccentric ring, which is required by the prior art, is avoided by the present disclosure. The coupling of pump units 2 to the lubricant pump 100 is simplified.

LIST OF REFERENCE NUMERALS

1 Pump housing
2 Pump unit
3 Pump drive
4 Coupling mechanism
5 Latching connection
6 Guide element
7 Screw connection
10 Receiving opening
12 Lubricant outlet opening
20 Delivery piston
21 Coupling section
22 Pump-side latching element
23 Circumferential projection
24 Circumferential groove
25 Suction opening
26 Outlet opening
27 End face
28 Pump cylinder
30 Drive shaft
31 Eccentric element, eccentric disc
32 Rolling bearing
33 Rolling bearing
34 Outer bearing ring
35 Outer bearing ring
41 Coupling section
42 Drive-side latching element
43 Carrier element
44 Displacement guide
45 Guide element
46 Latching projection
47 Spring guide opening
48 Latching block
49 Sliding surface
50 Spring element
51 Stop surface
52 Stop surface
53 Through opening
61 Latching surface
62 Beveled surface section
63 Guide surface
69 Latching recess
71 Latching surface
72 Beveled surface section
73 Guide surface
100 Lubricant pump
A Longitudinal axis
R Radial direction

The invention claimed is:

1. A lubricant pump for conveying lubricant from a lubricant reservoir to at least one pump outlet, comprising
a pump housing with a longitudinal axis (A),
wherein the pump housing has at least one receiving opening and a lubricant outlet opening into the receiving opening,
a pump drive,
at least one pump unit with a reciprocating delivery piston,
wherein the at least one pump unit has a suction opening, which corresponds with the lubricant outlet opening when the at least one pump unit is inserted into the receiving opening, and an outlet opening for lubricant,
a coupling mechanism for driving the at least one pump unit, wherein the coupling mechanism comprises:
an eccentric element, which is rotatable about the longitudinal axis (A) by the pump drive,
a drive-side coupling section connected to the eccentric element, and
a pump-side coupling section of the at least one pump unit,
wherein the drive-side coupling section and the pump-side coupling section for coupling the pump unit to the pump drive can be connected to one another automatically, and wherein the eccentric element is connected in a rotationally fixed manner to the drive-side coupling section, wherein the drive-side coupling section is designed as an eccentric ring which forms a circumferential drive-side latching element.

2. The lubricant pump according to claim 1, wherein the drive-side coupling section has or forms at least one drive-side latching element and the pump-side coupling section has or forms a pump-side latching element, which in the coupled state of the pump unit cooperate in a positive-locking manner.

3. The lubricant pump according to claim 1, wherein the drive-side latching element and the pump-side latching element have at least one latching recess and at least one latching projection, respectively, or vice versa, which are shaped to match one another.

4. The lubricant pump according to claim 1, wherein the coupling mechanism comprises at least one resilient latching element, the resilient latching element comprising a resilient drive-side latching element and/or a resilient pump-side latching element, wherein the resilient latching element is elastically deformable and/or resiliently mounted.

5. The lubricant pump according to claim 4, wherein the at least one resilient latching element is displaceable at least substantially parallel to a radial direction (R) of the pump housing.

6. The lubricant t pump according to claim 4, wherein the at least one resilient latching element is displaceable at least substantially perpendicular to a radial direction (R) of the pump housing.

7. The lubricant pump according to claim 1, wherein the coupling mechanism comprises a spring element which acts upon a displaceably mounted latching element with a displacement restoring force and is supported against the drive-side coupling section or the pump-side coupling section.

8. The lubricant pump according to claim 1, wherein the coupling mechanism has a displacement guide for a displaceable latching element, which limits the displacement path of the latching element, by stop surfaces, wherein the displacement guide defines a maximum latching position and/or a maximum release position of the latching element.

9. A lubricant pump for conveying lubricant from a lubricant reservoir to at least one pump outlet, comprising
a pump housing with a longitudinal axis (A),
wherein the pump housing has at least one receiving opening and a lubricant outlet opening into the receiving opening,
a pump drive,
at least one pump unit with a reciprocating delivery piston,
wherein the at least one pump unit has a suction opening, which corresponds with the lubricant outlet opening when the at least one pump unit is inserted into the receiving opening, and an outlet opening for lubricant,
a coupling mechanism for driving the at least one pump unit, wherein the coupling mechanism comprises:
an eccentric element, which is rotatable about the longitudinal axis (A) by the pump drive,
a drive-side coupling section connected to the eccentric element, and
a pump-side coupling section of the at least one pump unit,
wherein the drive-side coupling section and the pump-side coupling section for coupling the pump unit to the pump drive can be connected to one another automatically, and wherein the drive-side coupling section comprises a carrier element which is rotatably mounted relative to the eccentric element, and carries a drive-side latching element.

10. The lubricant pump according to claim 9, wherein a guide element is resiliently mounted in a radially displaceable manner in the pump housing, and the carrier element forms a sliding surface for the forced guidance of the carrier element by the guide element, wherein the carrier element executes a tumbling movement about the longitudinal axis (A).

11. The lubricant pump according to claim 10, wherein a spring element is arranged between the drive-side latching element and the carrier element, the drive-side latching element displaceable parallel to the longitudinal axis (A).

12. The lubricant pump according to claim 10, wherein the coupling mechanism has a displacement guide, and wherein the displacement guide comprises a guide element for a displaceable latching element, the guide element being slidably mounted in the carrier element parallel to the longitudinal axis (A), the guide element configured to be slidably guided in a through opening of the carrier element.

13. The lubricant pump according to claim 12, wherein the guide element forms a stop surface on a side of the carrier element facing away from the latching element, the stop surface defining a maximum latching position of the latching element, and wherein the guide element is connected to the latching element on the side facing the latching element.

14. A lubricant pump for conveying lubricant from a lubricant reservoir to at least one pump outlet, comprising
a pump housing with a longitudinal axis (A),
wherein the pump housing has at least one receiving opening and a lubricant outlet opening into the receiving opening,
a pump drive,
at least one pump unit with a reciprocating delivery piston,
wherein the at least one pump unit has a suction opening, which corresponds with the lubricant outlet opening when the at least one pump unit is inserted into the receiving opening, and an outlet opening for lubricant,
a coupling mechanism for driving the at least one pump unit, wherein the coupling mechanism comprises:
an eccentric element, which is rotatable about the longitudinal axis (A) by the pump drive,
a drive-side coupling section connected to the eccentric element, and
a pump-side coupling section of the at least one pump unit,
wherein the drive-side coupling section and the pump-side coupling section for coupling the pump unit to the pump drive can be connected to one another automatically, wherein the drive-side coupling section has or forms at least one drive-side latching element and the pump-side coupling section has or forms a pump-side latching element, which in the coupled state of the pump unit cooperate in a positive-locking manner and wherein a radially outwardly oriented latching surface of the pump-side latching element and/or a radially inwardly oriented latching surface of the drive-side latching element have a surface section which is beveled with respect to a radial direction (R).

15. The lubricant pump according to claim 9, wherein a latching block carried by the carrier element and mounted displaceably in the carrier element parallel to the longitudinal axis (A) forms a drive-side latching element as a straight latching projection.

16. The lubricant pump according to claim 14, wherein the pump-side latching element is formed by a circumferential projection of the delivery piston and/or a drive-side latching element is formed by a latching projection extending transversely to a radial direction (R).

17. The lubricant pump according to claim 14, wherein in the coupled state of the pump unit, an end face of the pump-side latching element rests against an outer bearing ring of a rolling bearing held by the eccentric element or against an outer surface of the carrier element.

18. The lubricant pump according to claim 17, wherein a spring element exerts a contact pressure on the pump-side latching element via beveled surface sections of the drive-side latching element and/or the pump-side latching element against the outer bearing ring of the rolling bearing or the outer surface of the carrier element.

19. A lubricant pump for conveying lubricant from a lubricant reservoir to at least one pump outlet, comprising
a pump housing with a longitudinal axis (A),
wherein the pump housing has at least one receiving opening and a lubricant outlet opening into the receiving opening,
a pump drive,
at least one pump unit with a reciprocating delivery piston,
wherein the at least one pump unit has a suction opening, which corresponds with the lubricant outlet opening when the at least one pump unit is inserted into the receiving opening, and an outlet opening for lubricant,
a coupling mechanism for driving the at least one pump unit, wherein the coupling mechanism comprises:
an eccentric element, which is rotatable about the longitudinal axis (A) by the pump drive,
a drive-side coupling section connected to the eccentric element, and
a pump-side coupling section of the at least one pump unit,
wherein the drive-side coupling section and the pump-side coupling section for coupling the pump unit to the pump drive can be connected to one another automatically, wherein the drive-side coupling section has or forms at least one drive-side latching element and the pump-side coupling section has or forms a pump-side latching element, which in the coupled state of the pump unit cooperate in a positive-locking manner and wherein a guide surface of the pump-side latching element and/or a guide surface of the drive-side latching element is beveled with respect to the radial direction (R).

20. A method for coupling a pump unit to a lubricant pump according to claim 1, comprising the following steps:
insertion of the pump unit into the receiving opening of the pump housing of the lubricant pump,
wherein the lubricant outlet opening of the pump housing opens into the receiving opening,
wherein the pump unit comprises the reciprocatingly movable delivery piston, the suction opening and an outlet opening for lubricant, coupling the pump unit to the coupling mechanism of the lubricant pump by producing a resilient latching connection of the pump-side coupling section—of the pump unit having the drive-side coupling section which is connected to the eccentric element, wherein the eccentric element is rotatable about the longitudinal axis (A) by the pump drive for driving the coupling mechanism,
wherein the latching connection is established automatically by rotation of the eccentric element.

21. The method according to claim 20, wherein, in order to produce the latching connection, a displacement restoring force applied by a spring element to a displaceable drive-side latching element and/or a displaceable pump-side latching element, is overcome.

22. The lubricant pump according to claim 14, wherein the gradients of the guide surfaces are substantially identical between 15° and 30°.

23. The lubricant pump according to claim 19, wherein the gradients of the guide surfaces are substantially identical between 20° and 30°.

24. A method for coupling a pump unit to a lubricant pump according to claim 9, comprising the following steps:
insertion of the pump unit into the receiving opening of the pump housing of the lubricant pump,
wherein the lubricant outlet opening of the pump housing opens into the receiving opening,
wherein the pump unit comprises the reciprocatingly movable delivery piston, the suction opening and an outlet opening for lubricant, coupling the pump unit to the coupling mechanism of the lubricant pump by producing a resilient latching connection of the pump-side coupling section—of the pump unit having the drive-side coupling section which is connected to the eccentric element, wherein the eccentric element is rotatable about the longitudinal axis (A) by the pump drive for driving the coupling mechanism,
wherein the latching connection is established automatically by rotation of the eccentric element.

25. A method for coupling a pump unit to a lubricant pump according to claim 14, comprising the following steps:
insertion of the pump unit into the receiving opening of the pump housing of the lubricant pump,
wherein the lubricant outlet opening of the pump housing opens into the receiving opening,
wherein the pump unit comprises the reciprocatingly movable delivery piston, the suction opening and an outlet opening for lubricant, coupling the pump unit to the coupling mechanism of the lubricant pump by producing a resilient latching connection of the pump-side coupling section—of the pump unit having the drive-side coupling section which is connected to the eccentric element, wherein the eccentric element is rotatable about the longitudinal axis (A) by the pump drive for driving the coupling mechanism,
wherein the latching connection is established automatically by rotation of the eccentric element.

26. A method for coupling a pump unit to a lubricant pump according to claim 19, comprising the following steps:
insertion of the pump unit into the receiving opening of the pump housing of the lubricant pump,
wherein the lubricant outlet opening of the pump housing opens into the receiving opening,
wherein the pump unit comprises the reciprocatingly movable delivery piston, the suction opening and an outlet opening for lubricant, coupling the pump unit to the coupling mechanism of the lubricant pump by producing a resilient latching connection of the pump-side coupling section—of the pump unit having the drive-side coupling section which is connected to the eccentric element, wherein the eccentric element is rotatable about the longitudinal axis (A) by the pump drive for driving the coupling mechanism,
wherein the latching connection is established automatically by rotation of the eccentric element.

* * * * *

UNITED STATES PATENT AND TRADEMARK OFFICE
CERTIFICATE OF CORRECTION

PATENT NO. : 11,608,831 B2
APPLICATION NO. : 16/818532
DATED : March 21, 2023
INVENTOR(S) : Bernard Koeppel et al.

It is certified that error appears in the above-identified patent and that said Letters Patent is hereby corrected as shown below:

In the Claims

Claim 1, Column 12, Line 47, "outlet opening into" should be --outlet opening opening into--.

Claim 5, Column 13, Lines 24-25, "displaceable at least substantially" should be --displaceable substantially--.

Claim 6, Column 13, Lines 28-29, "displaceable at least substantially" should be --displaceable substantially--.

Claim 9, Column 13, Line 47, "outlet opening into" should be --outlet opening opening into--.

Claim 14, Column 14, Line 33, "outlet opening into" should be --outlet opening opening into--.

Claim 19, Column 15, Line 21, "outlet opening into" should be --outlet opening opening into--.

Signed and Sealed this
Eighth Day of August, 2023

Katherine Kelly Vidal
*Director of the United States Patent and Trademark Office*